United States Patent [19]
Suelzle et al.

[11] 4,020,361
[45] Apr. 26, 1977

[54] SWITCHING MODE POWER CONTROLLER OF LARGE DYNAMIC RANGE

[75] Inventors: Larry R. Suelzle; Leonard O. Hodges, both of Huntington Beach, Calif.

[73] Assignee: Delta Electronic Control Corporation, Costa Mesa, Calif.

[22] Filed: Oct. 4, 1974

[21] Appl. No.: 512,059

[52] U.S. Cl. .................................. 307/106; 318/341; 318/599

[51] Int. Cl.² ........................................ H03K 3/00

[58] Field of Search .............. 318/599, 341, 345 E, 318/171; 329/106; 307/106

[56] References Cited

UNITED STATES PATENTS

| | | | |
|---|---|---|---|
| 3,175,167 | 3/1965 | Lloyd | 318/171 |
| 3,260,912 | 7/1966 | Gregory | 318/345 E |
| 3,523,228 | 8/1970 | Currie | 318/599 |
| 3,525,029 | 8/1970 | Joslyn et al. | 318/599 |
| 3,706,923 | 12/1972 | Dunfield | 318/599 |

Primary Examiner—David Smith, Jr.
Attorney, Agent, or Firm—William W. Haefliger

[57] ABSTRACT

This invention concerns improvements in the switching control of power or voltage into a load. Specifically it is concerned with a new time sequencing technique for the switching states of a four-switch configuration for the purpose of producing a three-state, pulse-duration-modulated output having a more ideal waveform and consequently better fidelity in the synthesis of a desired output signal. The new sequencing technique permits pulses of short time duration to be produced without requiring individual switches to recover quickly after having changed states from on to off or from off to on. This results in short pulses being produced with greater accuracy in the length of the pulse and consequently extends the useful dynamic range available at the output.

11 Claims, 6 Drawing Figures

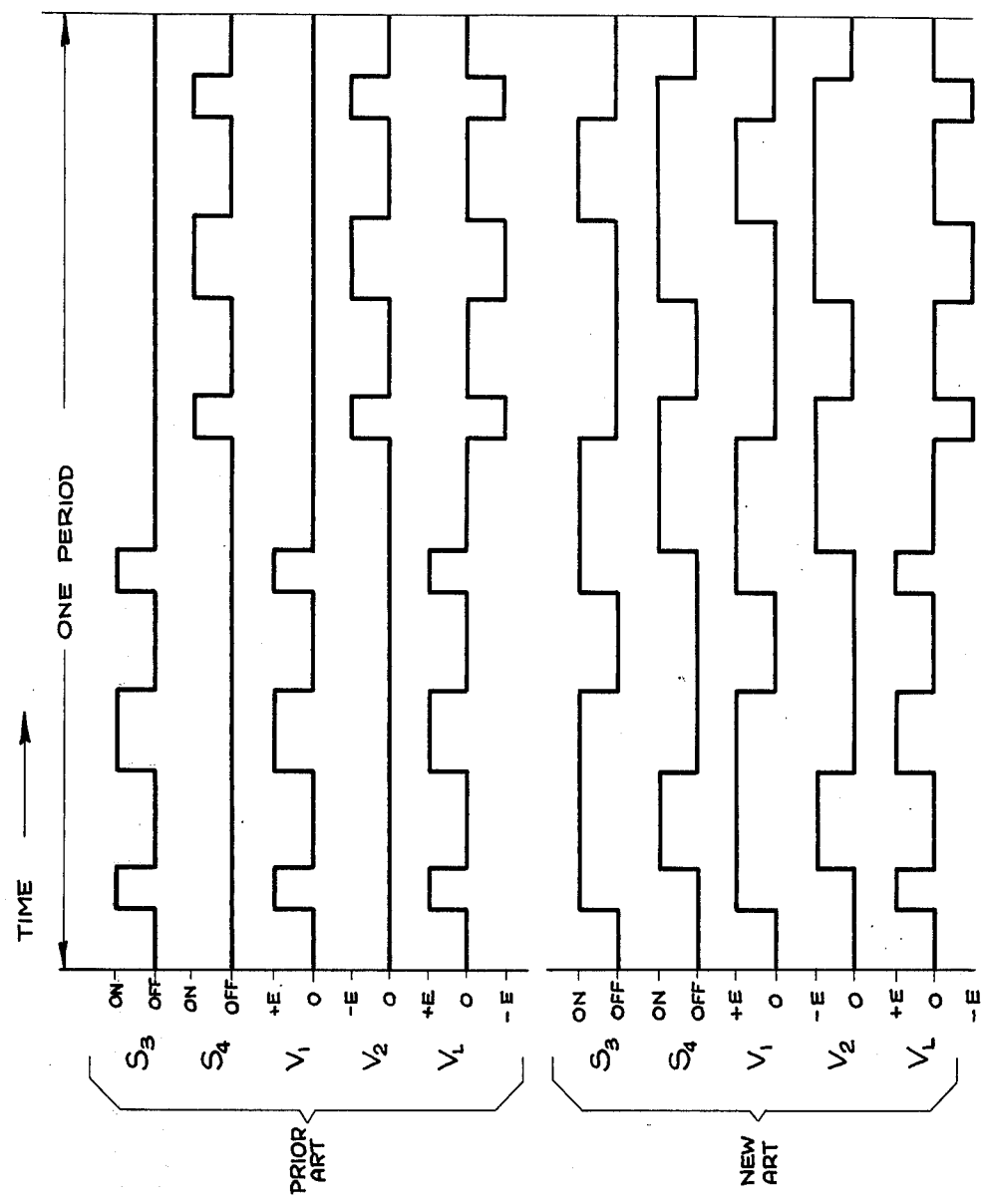
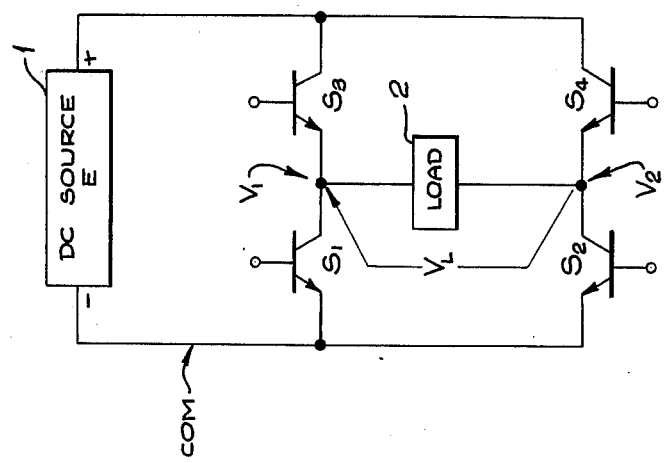
FIG. 1a.
FIG. 1.

SWITCHING MODE POWER CONTROLLER OF LARGE DYNAMIC RANGE

BACKGROUND OF THE INVENTION

Switching-mode power controllers (e.g., inverters, converters, switching-mode amplifiers) are used when voltage or current into a load is to be controlled with minimum loss of power of the controller. Frequently with a.c. outputs there is a desired output waveform. In d.c. to a.c. inverters, for example, it may be desirable that the output voltage into a load closely approximate some reference voltage, possibly sinusoidal. When the output is synthesized by a sequence of rectangular pulses as with pulse-duration modulation for example, the fidelity to which the output waveform conforms to the desired waveform depends on many factors, such as the frequency of switching, the particular modulating scheme chosen, the physical limitations of the switching devices, and the characteristics of any incorporated output filtering.

When the output signal from the switching mode power controller must span a relatively large dynamic range, such as might be necessary when the reference signal is a music or voice signal, the required output pulses from the power switches become very short in duration at the low power levels. In the past the ability to make pulses of short duration and therefore the ability to cover a large dynamic range has been limited by the finite rise, fall, and recovery times of the power switches themselves.

SUMMARY OF THE INVENTION

This invention presents a new time sequence technique and the circuit means for producing a three-state, pulse-duration-modulated output from a bridge configuration of controllable switches in such a way as to overcome some of the minimum pulse-length limitations of the power switches and thus to improve the useful dynamic range.

Basically, the invention is embodied in a circuit for producing a three-state (+E, 0, and −E) PDM (pulse duration modulation) output, and includes a. switches $S_1$ and $S_3$ connected in series and across a voltage source, $S_1$ and $S_3$ being in opposite states of conduction, b. switches $S_2$ and $S_4$ connected in series and across the voltage source, $S_2$ and $S_4$ being in opposite states of conduction, c. a load with one end connected with the common point between switches $S_1$ and $S_3$ and the other end connected with the common point between switches $S_2$ and $S_4$, and d. means to produce a short pulse of interval $\Delta t$ across the load by controlling said switches to cause the switches of first one pair $S_1$ and $S_2$ and then the other pair $S_3$ and $S_4$ to switch between OFF states. In other words, we provide means to produce a short pulse of interval $\Delta t$ across the load by controlling the switches to switch from one of the two states which produce 0 voltage across the load ($S_1$ ON, or $S_3$ ON and $S_4$ ON), to an intermediate state where voltage is produced across the load ($S_1$ ON and $S_4$ ON, or $S_3$ ON and $S_2$ ON) and then to other 0 voltage state.

As will be seen, such means includes control apparatus to cause $S_1$ and $S_2$ (or $S_3$ and $S_4$) to shift from ON state to OFF state by initiating shifting of first one and then the other of $S_3$ and $S_4$ (or $S_1$ and $S_2$) to ON state at sequential initiation times defining the interval $\Delta t$. Also, $\Delta t$ is controllable, as will appear. In this regard, when $S_1$ is ON, $S_3$ will be OFF; and when $S_1$ is OFF, $S_3$ will be ON. The four states of conduction are: $S_1$ ON and $S_2$ ON; $S_1$ OFF and $S_2$ OFF; $S_1$ OFF and $S_2$ ON; and $S_1$ ON and $S_2$ OFF. The first two of these states produce zero volts across the load, and the last two of these states produce voltage across the load. Accordingly, there is provided control apparatus to cause a shift from a state where $S_1$ and $S_2$ (or $S_3$ and $S_4$) are both ON to the state where $S_3$ and $S_4$ (or $S_1$ and $S_2$) are both ON by first turning one and then the other of $S_3$ or $S_4$ (or $S_1$ or $S_2$) to ON states at sequential initiation times defining the interval $\Delta t$.

It is therefore an object of this invention to generate a three-state switched waveform by using a four-switch bridge configuration and alternating between the two different conditions which produce zero volts across the load, and referred to as "alternating zero" modes.

Another object of this invention is to extend the "alternating zero" principle to the circuit means using the bridge configuration in conjunction with a balancing transformer to provide single-ended, three-state output.

These and other objects and advantages of the invention, as well as the details of illustrative embodiments, will be more fully understood from the following description and drawings in which:

DRAWING DESCRIPTION

FIG. 1 shows the basic diagram of the four-switch bridge output circuit and FIG. 1a shows sequences of switch states for both the invention and for the prior art;

DETAILED DESCRIPTION

A comparison of the invention to the prior art can be made with the help of FIG. 1. In FIG. 1 controllable switches $S_1$ through $S_4$ in bridge configuration are connected to d.c. voltage source 1 to supply power to load 2. The controlled switches may typically be power transistors. $S_1$ and $S_3$ are connected in series across source 1 as are $S_2$ and $S_4$. Load 2 connects between the common point of $S_1$ and $S_3$ and the common point of $S_2$ and $S_4$. Voltages $V_1$ and $V_2$ are the voltages existing across switches $S_1$ and $S_2$ respectively. $S_1$ and $S_3$ are in opposite states of conduction (i.e., conducting or non-conducting) and similarly $S_2$ and $S_4$ are in opposite state of conduction. The voltage $V_L$ across load 2 is the difference of $V_1$ and $V_2$.

By the prior art, the three voltage states of +E, 0, or −E across the load are produced by the following switch states; (1) +E corresponds to $S_3$ ON and $S_2$ ON; (2) 0 volts corresponds to $S_1$ ON and $S_2$ ON; and (3) −E volts corresponds to $S_1$ ON and $S_4$ ON. A positive pulse is produced across the load by holding $S_2$ On and switching $S_3$ from OFF to ON to OFF. A negative pulse is produced across the load by holding $S_1$ ON and switching $S_4$ from OFF to ON to OFF. Note that in order to make a short duration positive pulse across the load, $S_3$ must turn on and back off rapidly ($S_1$ must turn off and back on rapidly). This results in the previously described problems.

In the present invention, use is made of the fact that there are two different sets of switch states which produce 0 voltage across the load: (1) $S_1$ ON and $S_2$ ON, or (2) $S_3$ ON and $S_4$ ON. Short pulses can be produced by alternating between these two zero voltage states. A short positive pulse can be produced for example be the following sequence of states: (1) $S_1$ ON and $S_2$ ON; (2) $S_3$ ON and $S_2$ ON; and (3) $S_3$ ON and $S_4$ ON. Note that the pulse was produced by each switch making only one state transition with no recovery required. The switches need only recover in the time between pulses. Shown in FIG. 1a are the sequences of switch states for which ideally the same output waveform is produced by the prior art and by the invention. With real switches where the recovery times are finite, the new technique enables more accurate production of narrow pulses.

Figure 2:
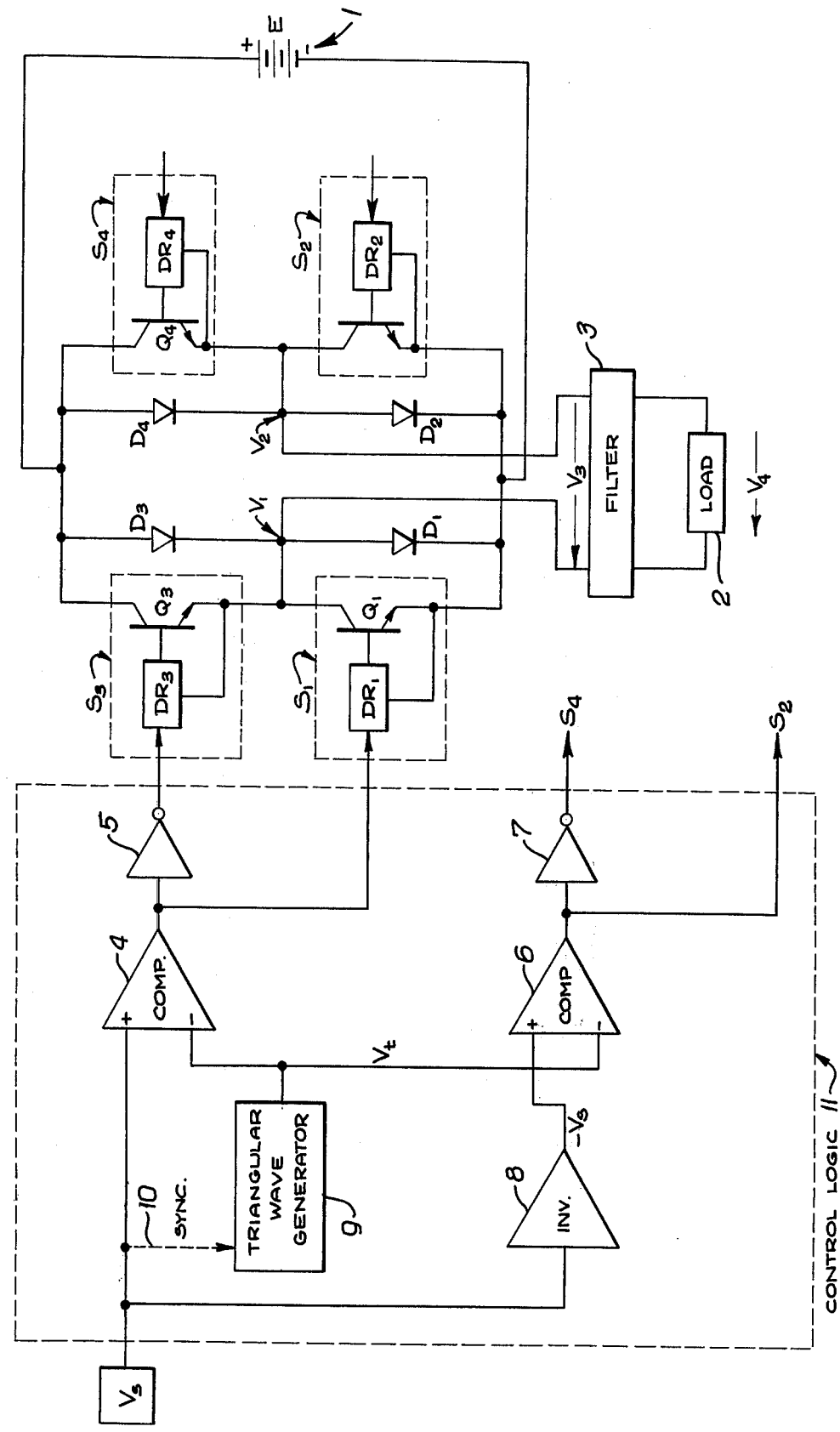
FIG. 2 shows one circuit means of the invention.

Referring to FIG. 2, there is illustrated a four-switch bridge-configuration power-output stage connected to d.c. voltage source 1 (voltage E) and controlled by control logic 11. Each of the power switches consists of a power transistor and a corresponding drive circuit. For example, $S_1$ includes the power transistor $Q_1$ (which could represent several paralleled transistors) and drive circuit DR1. Drive circuits per se as represented by DR1 are well-known art (power supplies for the drive circuits as well as for the logic circuits have been omitted from the diagram). Across each of the power switches is a corresponding diode ($D_1$ through $D_4$). These diodes permit reactively generated currents to flow against the normal conduction through the switches.

The control logic 11 comprises triangular wave generator 9, comparator amplifiers 4 and 6, unity-gain inverting amplifier 8, and logical inverters 5 and 7 connected as shown. All of these functional circuit units are available as integrated circuits. An example of the triangular wave generator is the Intersil model 8038 Precision Waveform Generator and Voltage Controlled Oscillator. The input signal $V_s$ is a voltage reference waveform to which the voltage $V_4$ across load 2 is to be made proportional. The source of $V_s$ in the case of a d.c. to a.c. inverter application would be typically from a sinusoidal waveform generator added to the inverter package (e.g., the Intersil model 8038 Waveform Generator can provide sinusoidal waveforms). When the power controller functions as an amplifier, $V_s$ is the signal-to-be-amplified.

The frequency of the triangular wave $V_t$ (seen in FIG. 3) output of generator 9 is typically chosen to be several times the highest frequency to be encountered for the signal $V_s$. It is sometimes desirable to synchronize the triangular wave with the input signal. This synchronization is represented by dashed-line 10 in FIG. 3. There are many well-known suitable synchronization circuits (see for example the manufacturer's application notes on the intersil Model 8038 Waveform Generator) usable at 10.

Triangular wave $V_t$ is compared to $V_2$ by comparator 4 and to $-V_s$ by comparator 6. The signal $-V_s$ is produced by unity-gain inverting amplifier 8. The logical output of comparator 4 determines the conduction state of switch $S_1$ ($S_1$ is ON when $V_s$ is more positive than $V_t$). Logical inverter 5 causes $S_3$ to be in a conduction state opposite to $S_1$. Similarly, the logical output of comparator 6 determines the conduction state of switch $S_2$ ($S_2$ is On when the signal $-V_s$ is more positive than $V_t$). Logical inverter 7 causes $S_4$ to be in a conduction state opposite to $S_2$.

Voltage $V_1$ and $V_2$ are the voltages across switches $S_1$ and $S_2$ respectively. The voltage $V_3$, which is the difference between $V_1$ and $V_2$, is applied to the load through filter 3. The filter, if needed, is used to attenuate the higher-frequency components (relative to the frequency of $V_s$) which are approximately twice (and higher) the frequency of $V_t$. Typically, the filter is a simple L-C low-pass filter (capacitor across the load and inductors between load and the output stage). In some narrow-band applications the filter is sometimes a simple series-resonant L-C circuit connected between the load and the output stage. The filter output is similar in waveform to $V_s$.

Figure 3:
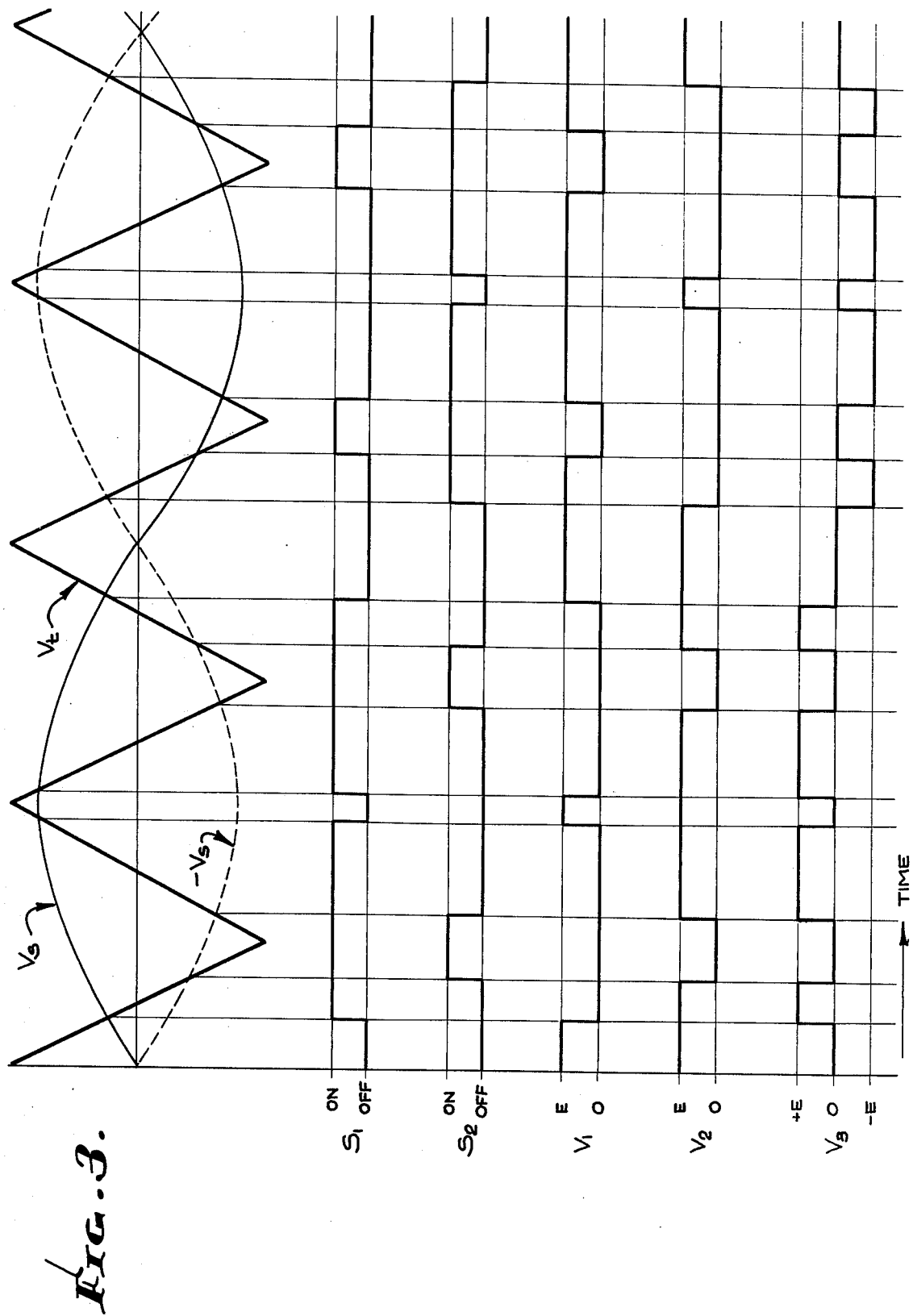
FIG. 3 shows the switching states and waveforms which correspond to the circuitry of FIG. 2.

FIG. 3 illustrates the switching states and waveforms which correspond to the circuit of FIG. 2. For clarity, $V_s$ is shown as sinusoidal and $V_t$ is shown synchronized with $V_s$. Generally, the only restriction imposed on $V_s$ is that the peak amplitude of $V_s$ be less than the peak amplitude of $V_t$ (this is to avoid a relatively large amount of distortion from occurring in the output). The intersections of $V_s$ and $-V_s$ with $V_t$ are indicated in FIG. 3. The output voltage $V_3$ is the difference between $V_1$ and $V_2$. Filtering applied to $V_3$ would produce a waveform approximating reference signal $V_s$.

Because voltages $V_1$ and $V_2$ vary with respect to the common potential, the load must be isolated electrically from either the common or the switching bridge. When the load circuit cannot be electrically isolated from common and the $V_s$ (and therefore $V_L$) does not contain a d.c. component, isolation may be provided by coupling $V_3$ to the load through a transformer in the usual way. In this regard, the box 3 labeled "filter" may be considered as alternately or inclusively representing a transformer. When $V_s$ does contain a d.c. component, the circuit shown in FIG. 4 can be used.

Figure 4:
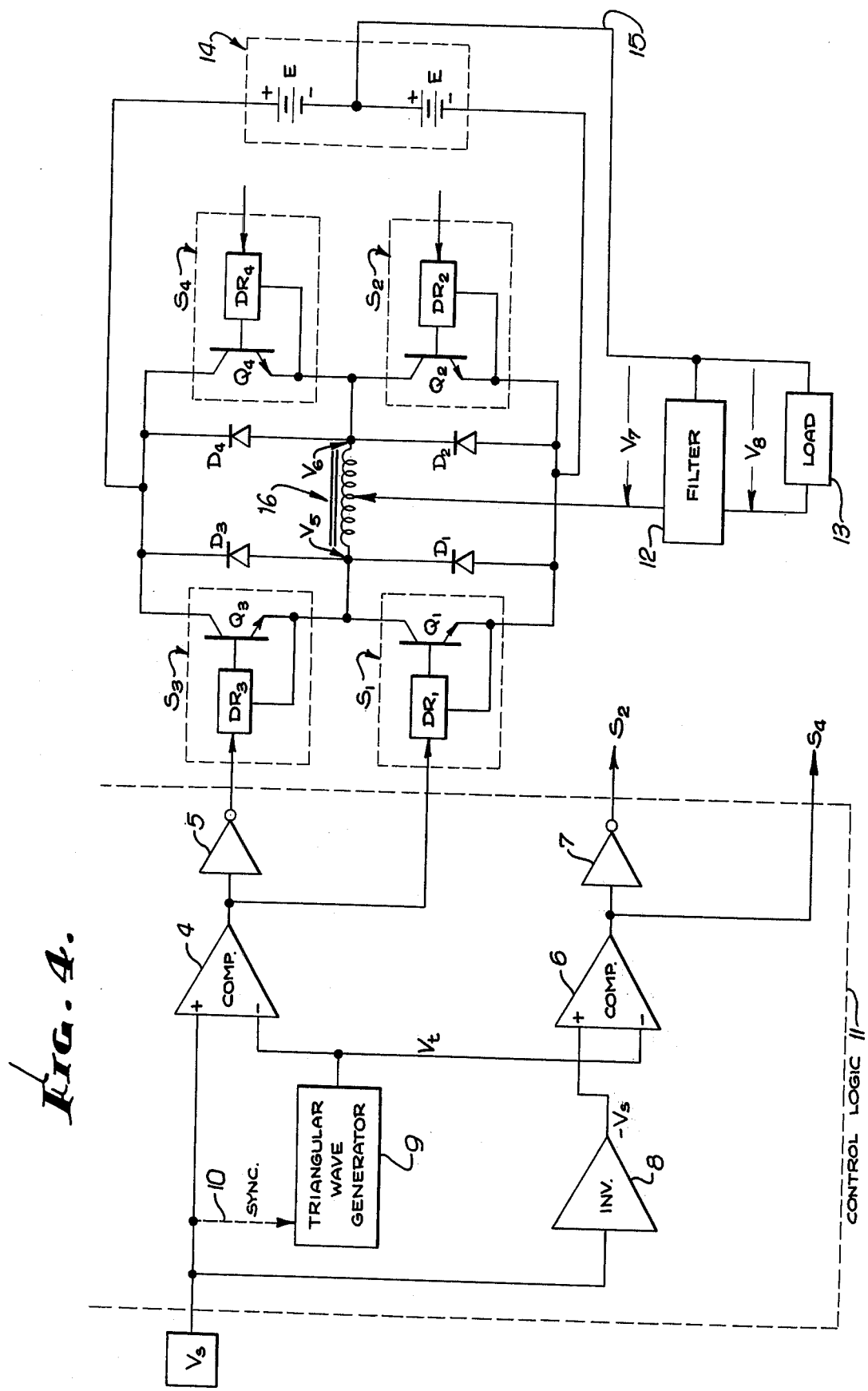
FIG. 4 illustrates circuit diagram of another form of the invention which uses a balancing transformer to provide single-ended output.

For the FIG. 4 circuit, the bridge configuration of switches $S_1$ through $S_4$ is connected across two d.c. power supplies 14, series connected. The common connection 15 between the two equal power supplies is the common line for the load circuit. The output to the load is taken from the center-tap of balancing transformer 16 which connects to each side of the bridge. The operation of the control logic 11 is the same as previously described, except that the output of comparator 6 now goes to $S_4$ and the output of inverter 7 now goes to $S_2$ (i.e., the ON—OFF states of $S_2$ and $S_4$ have been reversed when compared to the previous circuitry). The output voltage $V_7$ is the average between voltage $V_5$ and $V_6$ $$\left(\text{i.e., } V_7 = \frac{V_5 + V_6}{2}\right)$$

where $V_5$ is the voltage from the common line 15 to the connecting point between $S_1$ and $S_3$, and $V_6$ is the voltage from the common line 15 to the connecting point between $S_2$ and $S_4$. As in the case for the circuitry of FIG. 2, a filter 12 is used typically to attenuate the high-frequency components from the three-state output voltage $V_7$ to give a waveform across the load 13 which more closely approximates the reference signal $V_s$.

Figure 5:
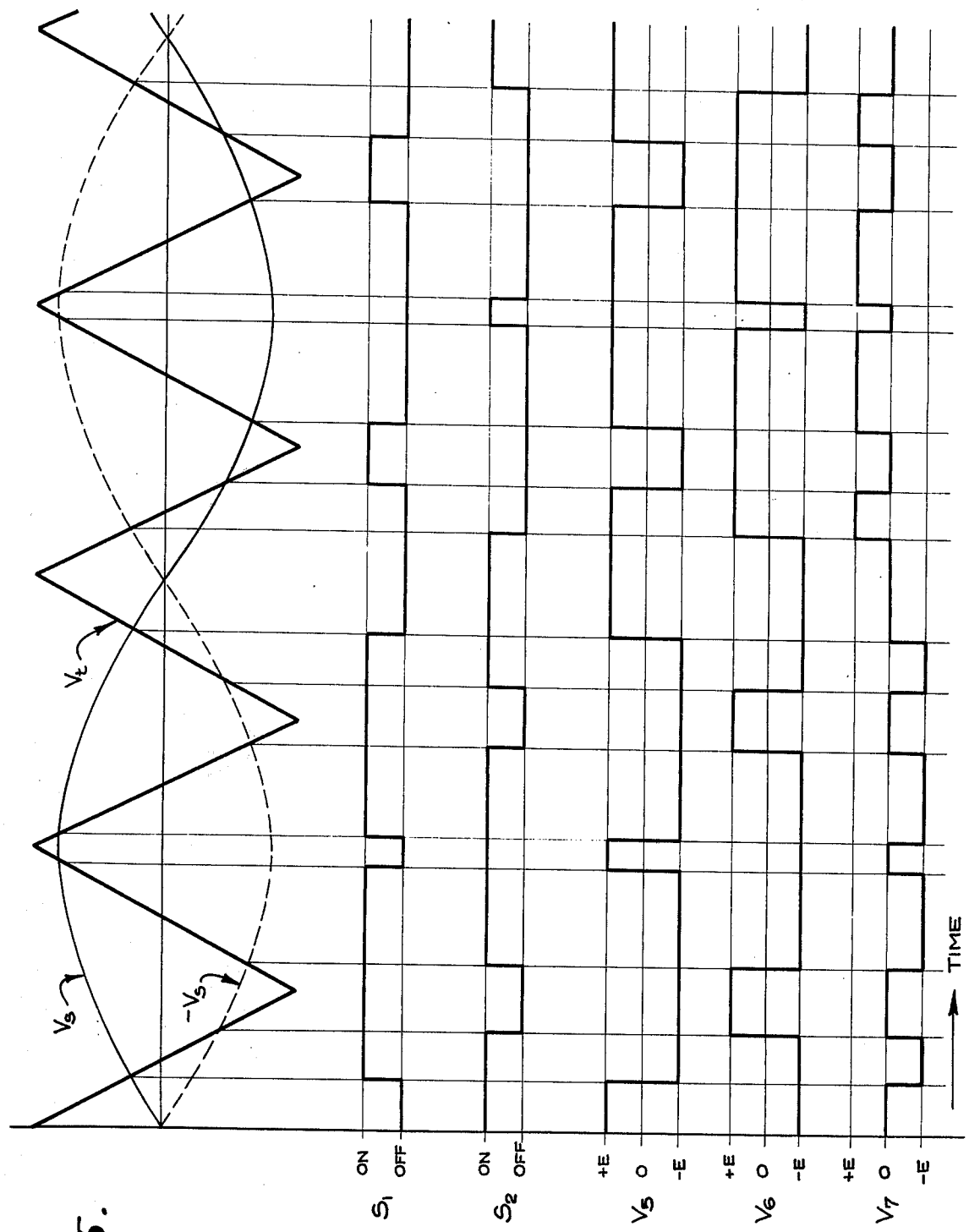
FIG. 5 shows the switching states and waveforms which corresponds to the circuitry of FIG. 4.

FIG. 5 shows the switching states and waveforms which correspond to the circuit of FIG. 4. As in the previous case $V_s$ is shown as sinusoidal and $V_t$ is shown synchronized with $V_s$.

From the foregoing, it is clear that the basic circuit of FIG. 2 includes:

a. switches $S_1$ and $S_3$ connected in series and across a voltage source, $S_1$ and $S_3$ being in opposite states of conduction, b. switches $S_2$ and $S_4$ connected in series and across the voltage source, $S_2$ and $S_4$ being in opposite states of conduction, c. a load connected with a common point between switches $S_1$ and $S_3$ and also connected with a common point between switch $S_2$ and $S_4$, and d. means to produce a short pulse of interval $\Delta t$ across the load by controlling the switches to switch from one of the two states which produce 0 voltage across the load ($S_1$ ON and $S_2$ ON, or $S_3$ ON and $S_4$ ON), to an intermediate state where voltage is produced across the load ($S_1$ ON and $S_4$ ON, or $S_3$ ON and $S_2$ ON) and then to other 0 voltage state.

Further, such means typically may include control apparatus to cause a shift from a state where $S_1$ and $S_2$ (or $S_3$ and $S_4$) are both ON to the state where $S_3$ and $S_4$ (or $S_1$ and $S_2$) are both ON by first turning one and then the other of $S_3$ or $S_4$ (or $S_1$ or $S_2$) to ON states at sequential initiation times defining the interval $\Delta t$.

We claim:

1. In a circut for producing a three state, PDM output, the combination comprising
    a. switches $S_1$ and $S_3$ connected in series and across a voltage source, $S_1$ and $S_3$ being in opposite states of conduction,
    b. switches $S_2$ and $S_4$ connected in series and across the voltage source $S_2$ and $S_4$ being in opposite states of conduction,
    c. a load with one end connected with the common point between switches $S_1$ and $S_3$ and the other end connected with the common point between switch $S_2$ and $S_4$, and
    d. means to produce a short pulse of interval $\Delta t$ across the load by controlling the switches to switch from one of the two states which produce 0 voltage across the load ($S_1$ ON and $S_2$ ON, or $S_3$ ON and $S_4$ ON), to an intermediate state where voltage is produced across the load ($S_1$ ON and $S_4$ ON, or $S_3$ ON and $S_2$ ON), and then to other 0 voltage state, said means including a wave generator and comparator means responsive to the output of the wave generator and to an input signal waveform $V_s$ to produce a first comparison output for controlling $S_1$ and $S_3$, and a second comparison output for controlling $S_2$ and $S_4$.

2. The circuit of claim 1 wherein said comparator means includes two comparators and is operable to cause a shift from a state where $S_1$ and $S_2$ (or $S_3$ and $S_4$) are both ON to the state where $S_3$ and $S_4$ (or $S_1$ and $S_2$) are both ON by first turning one and then the other of $S_3$ or $S_4$ (or $S_1$ or $S_2$) to ON states at sequential initiation times defining the interval $\Delta t$.

3. The circuit of claim 2 wherein said generator comprises a triangular wave generator having a triangular wave output connected with both comparators.

4. The circuit of claim 2 wherein the first comparator is responsive to values of $V_s$ of one polarity, and said first named means includes an inverter responsive to $V_s$ and having an output connected to the second comparator so that the second comparator is responsive to values of $V_s$ of the opposite polarity.

5. The circuit of claim 1 wherein the switches comprise power transistors.

6. The circuit of claim 1 including diodes connected across each of the switches $S_1$ to $S_4$.

7. The circuit of claim 4 including a filter connected at the input to the load.

8. The circuit of claim 1 including said voltage source, which is a DC source.

9. In a circuit for producing a three state, PDM output, the combination comprising
    a. switches $S_1$ and $S_3$ connected in series and across a voltage source, $S_1$ and $S_3$ being in opposite states of conduction,
    b. switches $S_2$ and $S_4$ connected in series and across the voltage source, $S_2$ and $S_4$ being in opposite states of conduction,
    c. said source being a DC source which includes effectively two DC supplies having a common connection therebetween,
    d. and a load having one end connected with said common connection, and the other end connected with the center tap of a transformer, one end of said transformer connected with the common point of $S_1$ and $S_3$, and the other end of said transformer connected with the common point of $S_2$ and $S_4$, and the conduction states of $S_2$ and $S_4$ interchanged,
    e. and control means operatively connected with said switches and including a wave generator and comparator means responsive to the output of the wave generator and to an input signal waveform $V_s$ to produce a first comparison output for controlling $S_1$ and $S_3$, and a second comparison output for controlling $S_2$ and $S_4$.

10. The circuit of claim 1 wherein said comparator means includes two comparators each of which is connected to receive as inputs the wave generator output and $V_s$, one of such inputs to one comparator being inverted relative to its corresponding input to the other comparator.

11. The circuit of claim 9 wherein said comparator means includes two comparators each of which is connected to receive as inputs the wave generator output and $V_s$, one of such inputs to one comparator being inverted relative to its corresponding input to the other comparator.

* * * * *